United States Patent [19]
Lambert et al.

[11] 3,801,296
[45] Apr. 2, 1974

[54] SHEET GLASS DRAWING

[75] Inventors: Michael Lambert, Brussels; Hubert Neuzy, Montignies/s/Sambre; Claude Brichard, Moustier/s/Sambre, all of Belgium

[73] Assignee: Glaverbel S.A., Watermael-Boitsfort, Belgium

[22] Filed: July 14, 1972

[21] Appl. No.: 271,759

[30] Foreign Application Priority Data
Apr. 14, 1971 Luxembourg.......................... 63534
July 6, 1972 Great Britain.................... 31766/72

[52] U.S. Cl............................ 65/95, 65/194, 65/204
[51] Int. Cl............................................ C03b 15/04
[58] Field of Search......... 65/95, 96, 193, 194, 196, 65/197, 198, 203, 204, 84, 162

[56] References Cited
UNITED STATES PATENTS
2,475,773  7/1949  Batchell............................. 65/95 X
2,726,486  12/1955  Brichard............................ 65/95 X
2,693,052  11/1954  Brichard................................. 65/84

Primary Examiner—Arthur D. Kellogg

[57] ABSTRACT

Method and apparatus for improving the quality of a drawn flat glass ribbon by providing for a flow of gas currents between the annealing lehr and the drawing chamber along paths which are in addition to the usual slot that the glass ribbon passes through when moving from the drawing chamber to the annealing lehr. In certain embodiments gas from the lower portion of the drawing chamber moves into the annealing lehr through special means which are provided.

18 Claims, 5 Drawing Figures

SHEET GLASS DRAWING

BACKGROUND OF THE INVENTION

The present invention relates to a process of manufacturing sheet glass by supplying molten glass to a drawing zone and drawing glass from that zone as a continuous ribbon through a drawing chamber and into a contiguous annealing lehr, tunnel or shaft via a slot through which gas convection currents also flow from the drawing chamber into the shaft and vice versa. The invention also relates to apparatus for use in manufacturing sheet glass by this process.

There are various known processes for manufacturing sheet glass by drawing a ribbon of molten glass from a drawing zone to which molten glass is supplied. In some of these processes the ribbon is drawn from the surface of a quantity of molten glass flowing to the drawing zone. An example of such a process is the classical Pittsburgh process in which the molten glass which flows into the ribbon is derived from the upper levels of a bath of molten glass. Another example of such a process is the classical Libbey-Owens or Colburn process in which molten glass flows into the ribbon from the full depth of a relatively shallow bath.

Surface drawing processes are not confined to the classical ones which have been specifically mentioned. For example, it is known to draw the ribbon from a supply of molten glass which is fed to the drawing zone while floating on a bath or layer of molten material, e.g., a molten metal, of higher specific gravity, acting as a lubricant between the molten glass and the sole of a refractory kiln in which the molten materials are held. As another example of a special type of surface drawing process, the ribbon of glass, instead of being drawn via a meniscus formed at a free fluid surface of the supply of molten glass, may be drawn from a meniscus which is cooled to prevent flow of molten glass beyond the locations of the meniscus as e.g., is described in United Kingdom Pat. No. 988,128. Although they are not so important for the purpose of introducing the present invention, mention is also made of processes in which the ribbon of glass is extruded from beneath the surface of the supply of molten glass, e.g., as in the classical Fourcault process.

In all of the known processes of drawing a ribbon of glass from a supply of molten glass, the ribbon is drawn from the drawing zone through a drawing chamber in which the ribbon becomes dimensionally set and the ribbon passes from the drawing chamber via an exit slot into a shaft in which the ribbon progressively cools preparatory to being cut into sections.

In all of such known glass drawing processes, the glass ribbon is exposed to the influence of environmental gas currents which exert, on the ribbons, a cooling action which is irregular in both time and space. These currents are due to various causes. Due to the interconnection of the drawing chamber and the annealing shaft, the shaft has a chimney effect, causing a system of natural draft currents to propagate through the drawing chamber and the annealing shaft. Hot gas currents flow upwardly along the central region of the ribbon from the intensely hot drawing zone, through the drawing chamber and into the annealing shaft via the aforesaid slot, and cooler currents of gases nearer the side walls of the apparatus flow back through such slot into the drawing chamber from the annealing shaft. The chimney effect is particularly marked when the annealing shaft is vertical.

The rising currents of hot gas caused by the aforesaid chimney effect increase in temperature and velocity during their movement through the drawing chamber and give rise to turbulence in the upper part of the chamber. There is an interaction between these turbulent currents and the natural draft currents which flow from the drawing chamber into the annealing shaft and vice versa. This interaction gives rise to a complex system of currents which plays a part in creating adverse heat distribution across the ribbon.

Some of the cooler gas flowing back into the drawing chamber from the annealing shaft tends to flow down within the drawing chamber along the walls thereof and then, as it becomes heated, to flow inwardly along generally upwardly inclined paths to join the main upward convection current of gas along the central longitudinal portion of the ribbon path. In the course of such flow some of this cooler gas sweeps across the marginal zones of the ribbon path and this also gives rise to adverse conditions.

SUMMARY OF THE INVENTION

The object of the present invention is to provide a form of corrective measure which influences the conditions to which the faces of the drawn glass ribbon are exposed, so as to make possible, an improvement in the realizable quality of sheet glass.

According to the present invention, there is provided a process of manufacturing sheet glass by supplying molten glass to a drawing zone and drawing glass from that zone as a continuous ribbon through a drawing chamber and into a contiguous annealing shaft via a slot through which gas convection currents also flow from the drawing chamber into the shaft and vice versa. Gases are also caused to flow between the interior of the drawing chamber and the interior of the annealing shaft via at least one path additional to that which is provided by the slot.

The provision of at least one additional flow path reduces the volume rate of flow of gas between the drawing chamber and the annealing shaft via the aforesaid slot in which the convection currents of gases are necessarily contrained to flow in close contact with the faces of the glass ribbon. In consequence, the pattern of gas currents in the upper part of the drawing chamber is modified. The modification is such as to produce more favorable heat distribution in the environment of the ribbon at this region as is indicated by the fact that sheet glass drawn by a process according to the invention has been found to be less impaired by the effects of turbulent, thermally heterogeneous currents than sheet glass drawn in a process in which no such additional gas flow path was provided but which was otherwise identical.

It is emphasized that the invention aims to obviate surface defects which are caused by adverse environmental conditions in the upper part of the drawing chamber. It is assumed in the present specification that other measures may also be taken when necessary to keep the drawn sheet glass as free as possible from defects produced by other types of environmental currents. By way of example, gas displacing forces may be exerted in the lower part of the drawing chamber to cause gases in the environment of the ribbon to undergo to-and-fro movement across the faces of the ribbon in order to avoid or reduce the adverse thermal gradients or inequalities which are responsible for the formation of waves in the faces of the drawn glass. As certain of the measures for countering the formation of the more serious surface defects are known per se they will not be referred to in the following description pertaining to the performance of the present invention.

Preferably, there is at least one such additional path along which gases flow from the drawing chamber into the annealing shaft. It has been found that the attainment of the required results, namely, an improvement in he heat distribution in the vicinity of the top of the drawing chamber is greatly assisted by reducing the mass and velocity of gases flowing upwardly through the aforesaid slot under the natural shaft forces. The effect of this reduction in the kinetic energy of the gases passing through the ribbon slot is to reduce the uncontrolled turbulent currents flowing against the surface of the ribbon.

In certain embodiments of the invention, the flow of gases which takes place between the interior of the drawing chamber and the interior of the annealing shaft, via such additional path or paths, is wholly or predominantly a flow from the drawing chamber to the annealing shaft.

It is very suitable for the gases ascending via at least one such additional path to be introduced into the annealing shaft at a level a short distance above the ribbon slot, e.g., at a level between such slot and the lowest pair of drawing rollers in the shaft.

Advantageously, there is at least one such additional flow path via which gases flow into the annealing shaft from the upper part of the drawing chamber. If the additional flow path or paths for conducting gases into the annealing shaft is or are traversed by gases which have already flowed upwardly into the upper part of the drawing chamber the process can be performed without substantially modifying the normal temperature gradient along the ribbon path if so desired.

In certain processes according to the invention, there is at least one such additional flow path for gases through the top of the drawing chamber, i.e., in the wall or walls defining the aforesaid ribbon slot. It is particularly easy to provide such an additional flow path by making such wall or walls of appropriate form or by modifying standard wall components, e.g., the conventional catch pans at the bottom of the annealing shaft, to provide such an additional path or paths through such wall components.

The invention also includes processes in which there is at least one such additional flow path via which gases descend into the drawing chamber from the annealing shaft. The descending relatively cool currents of gas flow mainly along the outer regions of the ribbon path, i.e., in general terms, in regions opposite the outer third portions of the projected width of the ribbon. It appears that in many cases the thermally heterogeneous turbulent currents contributing to the adverse heat distribution in the upper part of the drawing chamber are due to an appreciable extent or even entirely, to the behavior of the descending cooler currents of gases as they pass through the ribbon slot and then expand in the upper part of the drawing chamber. By providing an alternative flow path or alternative flow paths for such descending gases so that a proportion of the descending gases by-passes the ribbon slot, the environmental conditions in the upper part of the drawing chamber are improved.

In the most preferred embodiments of the invention, gases flow from the interior of the drawing chamber into the annealing shaft and also from the annealing shaft into the drawing chamber, via at least one such additional path. In such processes there is a reduced flow of gases through the ribbon slot in both the ascending and the descending convection currents and the favorable effect on the environmental conditions in the top portion of the drawing chamber and at the locations of the ribbon slot is particularly marked. In general terms, the ascending convection currents of gas are mainly within the central third portion of the intended or projected width of the ribbon so that, for causing gases which would normally pass through the ribbon slot with that current to by-pass the slot, it is necessary to provide at least one such additional flow path which is open to the drawing chamber at least within that central portion. The descending cooler convection currents of gas on the other hand are mainly within the outer third portions of the projected width of the ribbon so that in order to reduce the flow of descending cooler gas through the ribbon slot it is necessary to provide at least one such additional flow path which is open to the annealing shaft at least within one of such outer portions. The most pronounced beneficial effect on the environmental conditions in the vicinity of the top of the drawing chamber are achieved by embodiments of the present invention in which gases are caused to flow from the drawing chamber into the annealing shaft via at least one such additional flow path located within the central third of the projected width of the glass ribbon and gases are caused simultaneously to flow from the annealing shaft into the drawing chamber via at least one additional path located in each of the outer thirds of the projected width of the ribbon. An ascending and a descending flow of gases, by-passing the ribbon slot, may take place via one and the same additional flow path if there is a path in the form of a slot which extends over the full projected width of the ribbon path or the greater part of such width.

The invention includes processes in which a flow of gases via at least one additional flow path takes place as a result of natural convection currents. By making use of the inherent energy of the convection currents the need for gas displacing devices to promote or cause flow of gases along the additional path or paths is obviated.

Advantages are to be gained by causing a flow of gases along an additional flow path or paths confined to one side of the ribbon. This is because in certain processes it may be found that in the normal way one face of the glass ribbon is less prone to be marred than the other face, this being a result of a difference between the environmental conditions at the opposed sides of the glass ribbon. Nevertheless in preferred embodiments of the invention, gases are caueused to flow between the interior of the drawing chamber and the interior of the annealing shaft via at least one additional flow path on each side of the glass ribbon.

In certain embodiments of processes according to the invention a flow of gases from the annealing shaft into the drawing chamber takes place along one or more additional flow paths formed in such a way that gases descending via such additional path or paths are dispersed at or near the top of the drawing chamber. The descending gases may for example be dispersed in the sense that they are spatially distributed over a larger area, or dispersed in the sense that their energy is partly absorbed. By dispersing such gases they are rendered less liable to contribute to the creation of thermally heterogeneous turbulent currents acting against the surface of the glass ribbon in the upper part of the drawing chamber and the purpose in view is accordingly further promoted.

Advantageously, descending and ascending gases are caused to flow via additional flow paths formed so that gases moving in one direction are dispersed into gases moving in the other direction. As a result, there is a mixing of opposed gas currents and this has been found to be beneficial for promoting a favorable heat distribution.

According to other embodiments of the invention, a flow of gases from the annealing shaft into the drawing chamber takes place along one or more additional flow paths which is or are formed so as to disperse such descending gases away from the path of the ribbon. This is the most effective way of preventing such gases from directly acting on the glass ribbon in the upper part of the drawing chamber.

In certain special embodiments of the invention, gases are caused to flow into the annealing shaft, via at least one additional path, from a region in the lower part of the drawing chamber. By causing such a flow of gases there is brought about not only an improvement in the thermal and dynamic flow conditions in the region of transition from the drawing chamber to the annealing shaft, as a result of the reduced upward flow of gases through the ribbon slot, but also an improvement in the environmental condition of the ribbon in the lower part of the drawing chamber such as to reduce the tendency for the drawn sheet glass to be impaired by thermally heterogeneous convection currents. The withdrawal of gases from a region in the lower part of the drawing chamber and their introduction into the annealing shaft can, in certain circumstances, be relied upon for avoiding defects in the sheet glass.

In certain processes according to the invention wherein the glass ribbon is drawn past at least one cooler in the lower part of the drawing chamber, a flow of gases along at least one additional flow path takes place from at least one region in the vicinity of a cooler. The withdrawal of gases which have been cooled by a main cooler is particularly recommended for the purposes of creating environmental conditions which favor the production of sheet glass with faces substantially free from defects.

It has been found that in some cases the invention affords particular benefits in processes in which a secondary cooler or secondary coolers is or are provided in the upper part of the drawing chamber. There is occasionally the tendency for the adverse thermal conditions in the upper part of the drawing chamber which tend to cause defects in the faces of the sheet glass to be accentuated by the action of such secondary cooler or coolers. By means of the invention this influence of secondary coolers can be countered. In addition it has been found that in such cases the by-pass flow of gases in accordance with the invention is responsible for modifying the effects of secondary coolers on the gaseous environment in the upper part of the drawing chamber in such a way as to improve still more the quality of the faces of the sheet glass.

Particular importance is attached to processes according to the invention in which the annealing shaft is a vertical shaft surmounting the drawing chamber, as e.g., in a classical Pittsburgh-type glass drawing process.

The invention can be applied successfully in a wide variety of glass drawing processes, for example, in a process in which molten glass flows into the ribbon from the full depth of a quantity of molten glass in a channel into which molten glass is continuously fed, in a process in which molten glass flows into the ribbon from the upper levels of a mass of molten glass in a channel into which molten glass is continuously fed, and in a process in which the ribbon is drawn from molten glass floating on a mass of material of higher specific gravity.

The invention includes apparatus for use in manufacturing sheet glass, including a drawing chamber, a contiguous annealing shaft which communicates with such drawing chamber via a slot and means for drawing a continuous ribbon of glass from a supply of molten glass at a drawing zone so that the ribbon passes through such drawing chamber and into the annealing shaft via the said slot. Convection currents of gases also flow through such slot from the drawing chamber into the annealing shaft and vice versa. At least one path additional to the slot is provided along which additional path or paths gases can also flow between the interior of the drawing chamber and the interior of the annealing shaft.

Such apparatus affords the advantage that it enables sheet glass to be drawn which is not impaired or which is less impaired by defects due to the effects of turbulent thermally heterogeneous gas currents in the upper part of the drawing chamber. Various advantageous features which can be incorporated in apparatus according to the invention will now be referred to. Many of these further features are for the purpose of adopting process features which have already been described. The advantages of these further features of apparatus will be understood from what has already been written about corresponding process features.

The invention includes apparatus in which there is at least one additional path via such gases can pass upwardly into the annealing shaft from a region of the drawing chamber within the central third portion of the projected width of the ribbon path.

Preferably, apparatus according to the invention incorporates at least one additional path via which gases can pass upwardly into the annealing shaft from a region in the top portion of the drawing chamber and within the central third portion of the projected width of the ribbon path.

In simple embodiments of apparatus according to the invention there is at least one additional path through the top of the drawing chamber.

Preferably, the apparatus includes at least one additional flow path via which gases descending opposite an outer third portion of the projected width of the ribbon can flow from the annealing shaft into the drawing chamber.

In certain apparatus according to the invention there is at least one additional path via which gases can flow into the annealing shaft from a region in the drawing chamber located within the central third portion of the projected width of the ribbon path, and there is at least one additional path via which gases can simultaneously flow into the drawing chamber from regions in the annealing shaft which are opposite the outer third portion of the ribbon path.

It is possible to bring about the flow of gases via the additional flow path or flow paths without employing special devices, e.g., propellers, for maintaining such flow. Thus according to certain embodiments of apparatus according to the invention there is at least one additional path via which gases can flow between the drawing chamber and the annealing shaft due to natural convection currents.

Preferably, apparatus according to the invention incorporates at least one additional path on each side of the path or the ribbon.

The invention includes apparatus in which there is at least one additional flow path via which gases can descend from the interior of the annealing shaft into the drawing chamber, which path or paths is or are formed in such a way as to cause such descending gases to be dispersed at or near the top of the drawing chamber. In a simple form of apparatus functioning in that way there is a plurality of additional flow paths via which gases can descend from the interior of the annealing shaft into the drawing chamber and which are constituted by openings defined by meshes of a screen. By way of example there may be perforated plate screens, screens formed by woven filaments, or screens formed by spaced bars, such screens being located on opposite sides of the ribbon path at the top of the drawing chamber and being spaced apart so that the ribbon slot is defined by the inner edges of such screens.

The invention also includes apparatus in which there is at least one additional flow path via which gases can descend from the interior of the annealing shaft into the drawing chamber, which path or paths is or are formed in such a way as to disperse such descending gases away from the path of the ribbon. In a simple form of apparatus functioning in this way, there is a plurality of additional flow paths for descending gases, such path or paths being defined by vanes which deflect the descending gases away from the path of the ribbon. Such vanes may be pivotally mounted so that their inclination can be varied for adjusting the angles through which the descending gas streams are deflected away from the ribbon path.

If desired, the means defining one or more additional flow paths, e.g., one or more screens or vanes, can be heated. The heating of means defining a flow path for descending gases has the effect of slowing down the descending gas currents and thus making them less liable to give rise to turbulent flow and unsettled thermal conditions adjacent the ribbon in the upper part of the drawing chamber.

In certain special forms of apparatus according to the invention there is at least one additional path along which gases can flow into the annealing shaft from a region in the lower part of the drawing chamber. Thus, the invention includes apparatus in which there is at least one cooler located within the lower part of the drawing chamber, and in which there is at least one additional path which leads into the annealing shaft from a region of the drawing chamber in the vicinity of a cooler.

Preference is given to apparatus according to the invention in which the annealing shaft is a vertical shaft surmounting the drawing chamber.

Apparatus according to the invention may be of any one of a variety of different basic designs. For example, the invention includes apparatus having a molten glass feed channel for holding a bath of molten glass of such depth that molten glass flows into the ribbon from the full depth of such bath apparatus having a molten glass feed channel for holding a bath of molten glass of such depth that the molten glass which flows into the ribbon is derived from the upper levels of such bath and apparatus having a molten glass feed channel along which molten glass feeds to the drawing zone while floating on a mass of material of higher specific gravity.

The invention includes sheet glass when manufactured by a process according to the invention or in apparatus according to the invention as hereinbefore defined.

DESCRIPTION OF THE PREFERRED EMBODIMENTS

Figure 1:
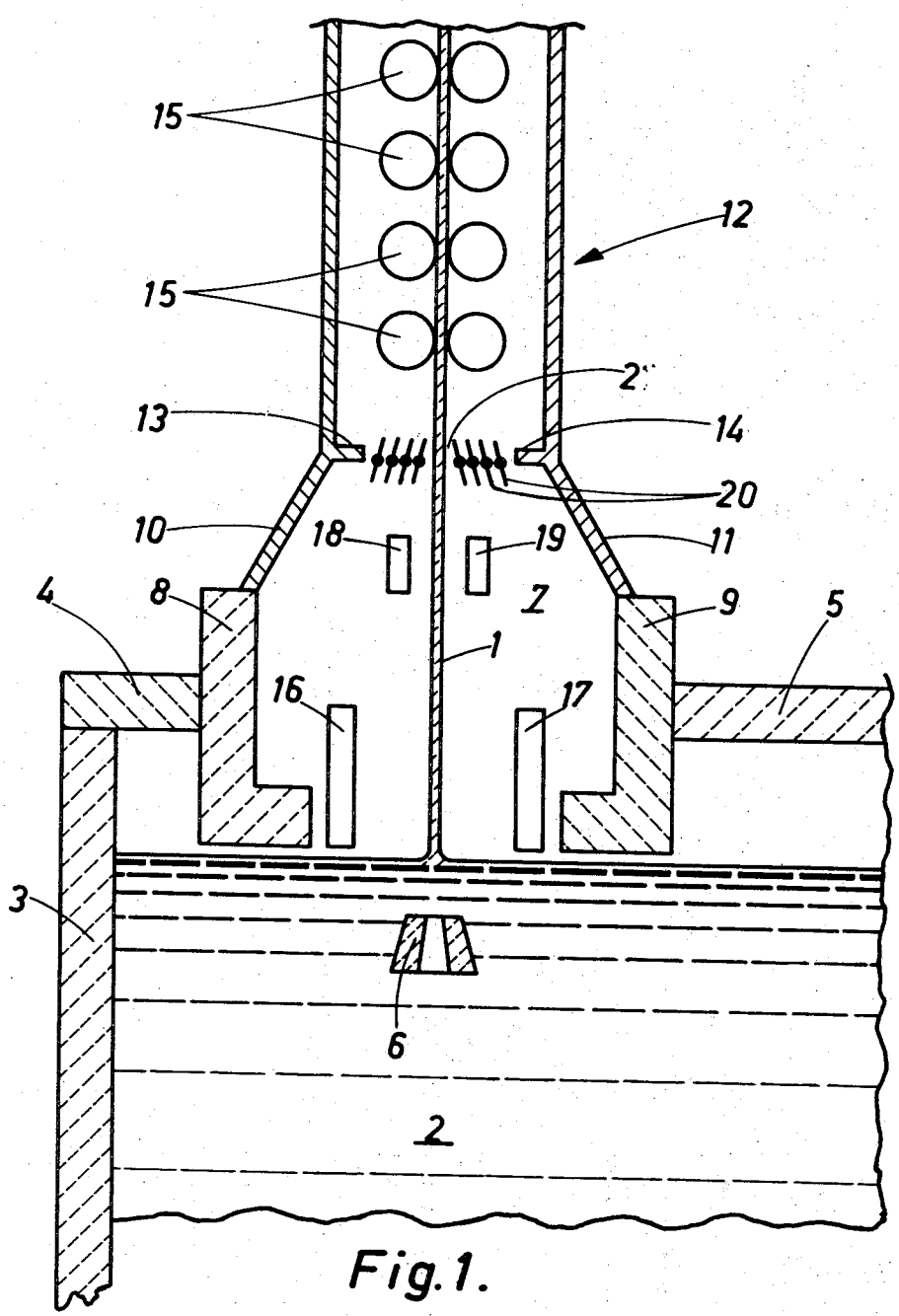
FIG. 1 is a cross-sectional elevation of part of a Pittsburgh-type glass drawing machine according to the invention.

It is emphasized that the embodiments illustrated in the drawings are entirely non-limitative. They have been selected merely to illustrate a few ways of carrying out the invention. Moreover, while the drawings illustrate the invention as applied to Pittsburgh-type glass drawing processes and machines, the invention is also applicable to the other types of glass drawing processes and machines.

As the drawing machines shown in the drawings are entirely analagous as regards their basic structure, the same reference numerals have been used through the whole series of figures for identifying parts of the different drawing machines which are strictly identical.

In the machine represented in FIG. 1, a continuous glass ribbon is drawn upwardly from the surface of a supply of molten glass 2 which is held in a kiln, the structure of which kiln includes a terminal end wall 3 and roof portions 4 and 5. At the drawing zone a draw bar 6 is submerged in the molten glass. This draw bar stabilizes the position of the bottom of the glass ribbon. The glass ribbon passes vertically upwardly through a drawing chamber 7 which is in part defined by the conventional rear and front L-blocks 8, 9 and by rear and front upper wall portions 10, 11 which join the tops of the L-blocks with the bottom of an annealing shaft 12.

In a classical Pittsburgh-type drawing machine there are so-called catch pans which extend inwardly towards the path of the glass ribbon from the rear and front walls of the annealing shaft, the inner boundaries of these catch pans being slightly spaced from one another so as to leave a slot for the passage of the ribbon from the drawing chamber into the annealing shaft. The machine represented in FIG. 1 involves a modification of this classical construction in that the normal catch pans are dispensed with. At the bottom of the annealing shaft there are narrow inwardly extending horizontal flanges 13 and 14 which are well spaced from the path of the glass ribbon in order to leave room for the accommodation of a system of vanes as will presently be described.

The glass ribbon is drawn upwardly by a series of drawing rollers 15 rotatably mounted in the annealing shaft 12 on opposite sides of the glass ribbon path.

In the drawing chamber there are the customary principal coolers 16, 17 which are located on opposite sides of the ribbon path, close to the surface of the supply of molten glass 2.

In the upper part of the drawing chamber there are secondary coolers 18, 19, also located in opposite sides of the ribbon path. The principal coolers 16, 17 and the secondary coolers 18, 19 are cooled by a cooling fluid, usually water, which is circulated through the coolers via conduits (not shown).

In conventional glass drawing processes, using a classical Pittsburgh-type glass drawing machine, the strong natural draft forces due to the chimney effect of the annealing shaft, cause hot gas currents to flow upwardly along the central region of the ribbon from the intensely hot drawing zone, through the drawing chamber and into the annealing shaft, via the aforesaid ribbon slot whereas cooler currents of gas flow back into the drawing chamber from the annealing shaft along the walls of the apparatus, mainly in the regions of the side margins of the ribbon path.

The descending cooler currents of gas mix with the hotter gases on the drawing chamber, forming a thermally heterogeneous mixture of gases which contacts the ribbon of glass in the top portion of the drawing chamber. The adverse environmental conditions in this region are also contributed to by the relatively high velocity of the hot gas currents ascending through the top portion of the drawing chamber, towards the said ribbon slot.

Thus there is formed a complex system of currents as hereinbefore referred to, which is thought to be at least in large part responsible for the aforesaid surface defects in the sheet glass.

The cooling action exerted by the secondary coolers on the environmental gases in the upper part of the drawing chamber may accentuate the adverse effects of the complex system of gas currents by increasing the velocity of certain of the downward currents. In any event, the action of the secondary coolers tends to influence the environmental conditions in a way which gives rise to the occurrence of certain surface defects in the drawn sheet glass.

In the embodiment of the invention represented in FIG. 1, means is provided which modifies the normal pattern of currents in the upper part of the drawing chamber in such a way as to reduce or avoid the turbulence and the high velocity of the currents.

The means which is responsible for this beneficial result includes a system of vanes 20. In this case there are eight vanes disposed in spaced relation, four on each side of the ribbon path, and the vanes on opposite sides of the ribbon path are upwardly mutually convergent. The result of the provision of these vanes is that the slot via which the ribbon 1 passes from the drawing chamber into the annealing shaft, is not defined by catch pans as in a classical machine but by the innermost of the vanes 20 located on opposite sides of the ribbon path. The important consequence of this arrangement is that flow of gases from the drawing chamber into the annealing shaft and vice versa can take place not only through the ribbon slot, and thus in close contact with the ribbon faces, but also through a number of alternative paths, namely the paths between neighboring vanes on each side of the ribbon path and between the outermost vanes and the flanges 13 and 14. As compared with the classical process, the amount of high velocity gas which flows through the ribbon slot in contact with the ribbon faces, in any given period of time, is substantially reduced. This may be an important reason why the described modification of the classical machine has the important beneficial effects which have been referred to.

Another feature of the illustrated embodiment of the invention, which is thought to be of some importance, is the downward divergence of the opposed sets of vanes away from the ribbon path. Due to this downward divergence of the vanes away from the ribbon path, currents of relatively cold gas descending along the side walls of the annealing shaft are deflected away from the ribbon as they pass from this shaft into the drawing chamber. Moreover the inclination of the vanes disturbs the upward trajectories of the high speed hot currents of gas flowing upwardly towards the annealing shaft.

The vanes 20 are pivotally mounted on horizontal axes so that their inclination can be varied.

Due to the beneficial effects on the pattern of convection currents in the upper part of the drawing chamber, it has been found that the drawing speed of the glass ribbon can be increased above the maximum which would normally be permissable for drawing glass of a predetermined surface quality.

Figure 2:
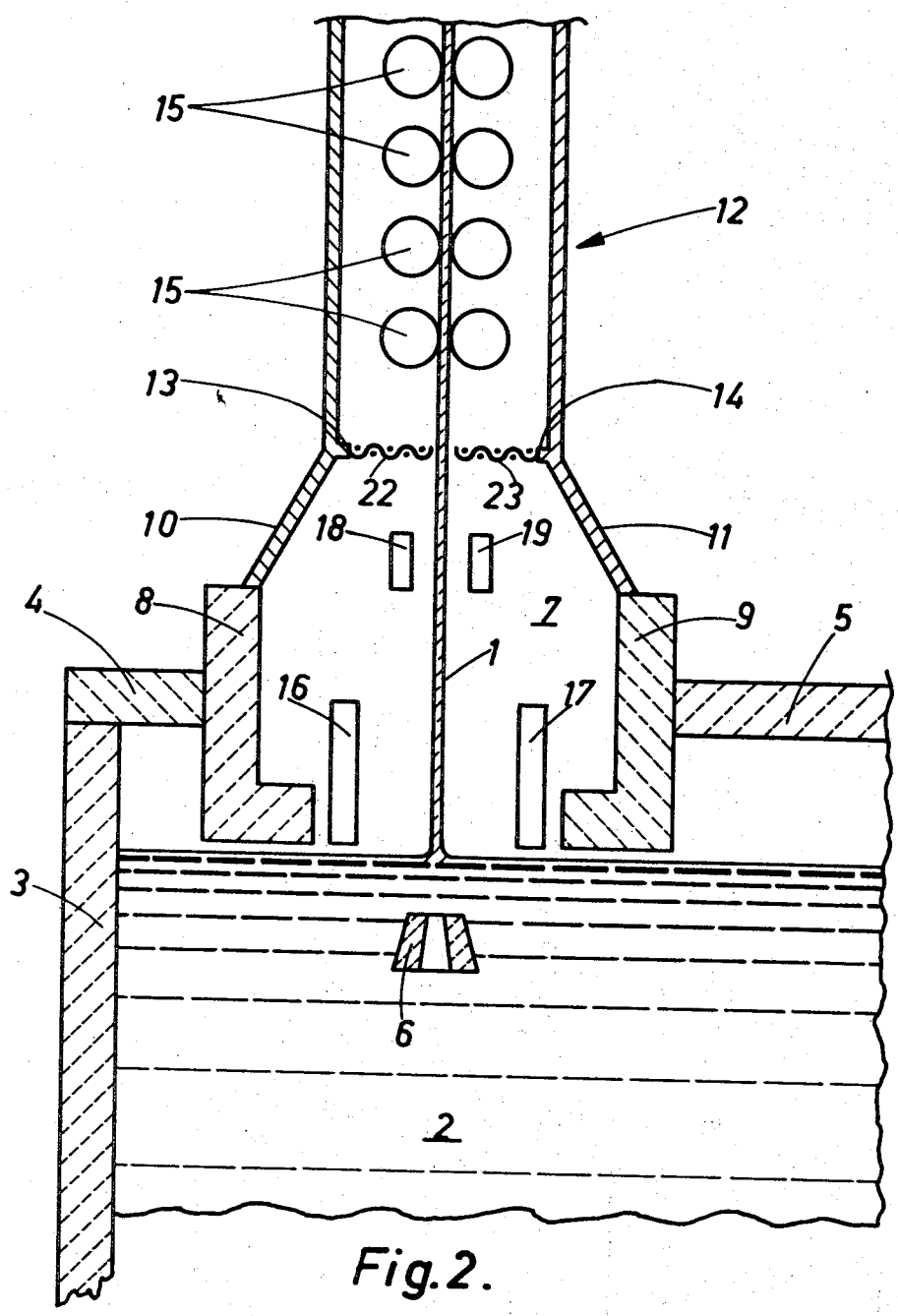
FIGS. 2 to 5 are similar cross-sectional elevations of parts of four further Pittsburgh-type glass drawing machines according to the invention.

In the embodiment of the invention represented in FIG. 2, the ribbon slot, i.e., the slot via which the ribbon passes from the drawing chamber into the annealing shaft, is defined not by the customary catch pans but by screens 22,23 of woven structure, which extend inwardly from the lateral flanges 13,14. As a result, gas can flow from the drawing chamber into the annealing shaft and vice versa, not only via the ribbon slot, but also via numerous alternative paths which are spaced away from the faces of the glass ribbon, such alternative paths being constituted by the openings or meshes in the screens 22 and 23. By virtue of the provision of these screens, there is a dispersion of the gas currents flowing into and from the annealing shaft and the amount of gas which flows in undisturbed high velocity streams in contact with the faces of the glass ribbon at the location of the ribbon slot is substantially reduced. It has been found that the provision of the screens influences the environmental conditions in such a way that the surface quality of the drawn sheet glass is considerably improved.

Figure 3:
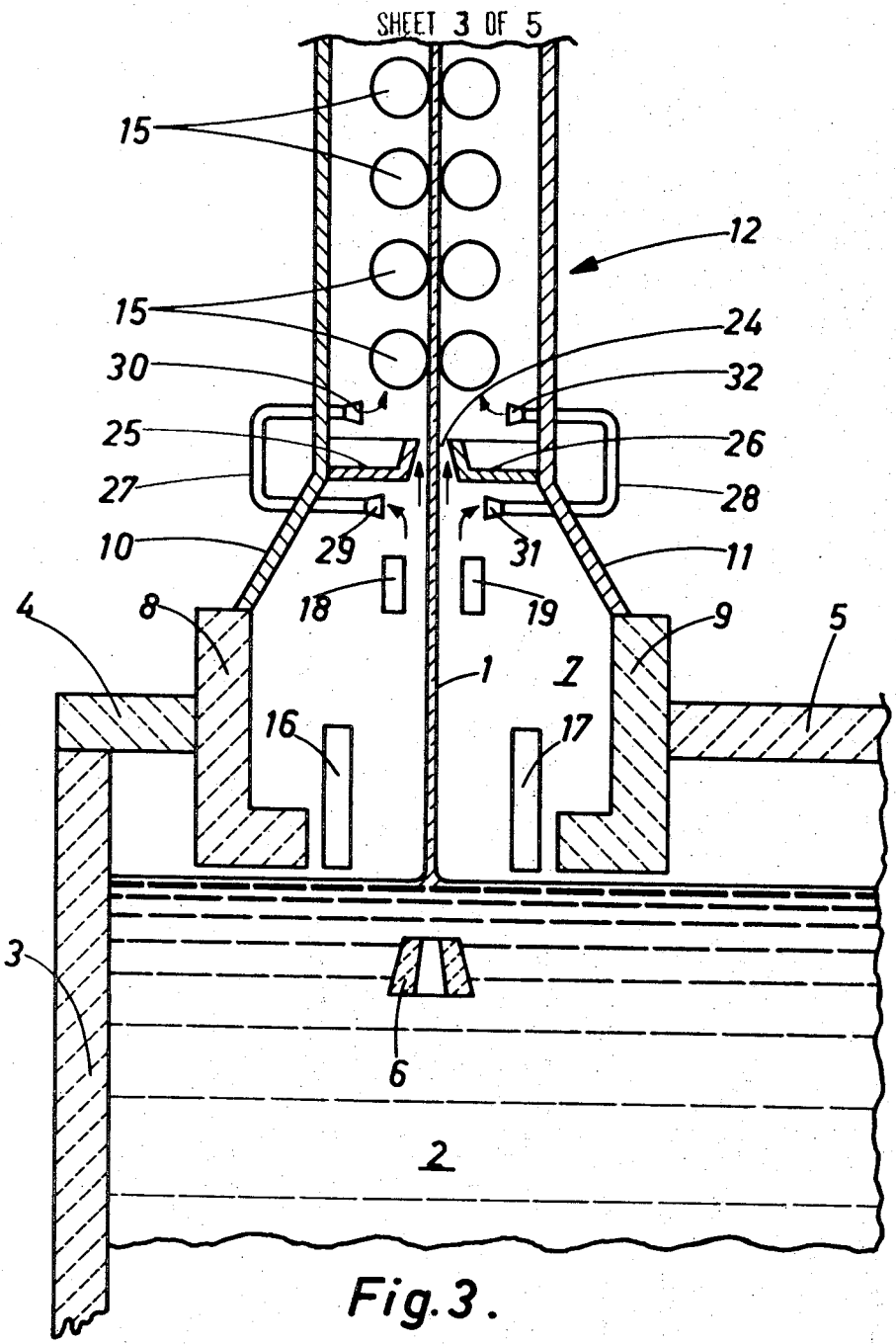

Reference is now made to the embodiment of the invention represented in FIG. 3. In this embodiment, the ribbon slot 24 is defined by catch paths 25,26 provided at the bottom of the annealing shaft 12. On opposite sides of the ribbon path there are conduits 27, 28 which extend through regions outside the drawing machine and which place the interior of the drawing chamber 7 into communication with the interior of the annealing shaft 12. The conduits 27, 28 are of elongated cross section, the major axes of their cross sections being normal to the plane of the drawing. The conduits extend over approximately the central third of the projected width of the ribbon path. However, the locations of at least the lower ends of the conduits relative to the projected width of the ribbon can be adjusted. When the machine is in use, ascending currents of hot gas can flow from the drawing chamber into the annealing shaft, not only via the ribbon slot 24 but also via the said conduits, which thus constitute "by-passes." At the rear side of the ribbon path, some of the ascending hot gas by-passes the slot 24 by flowing into the conduit 27 through its inlet end portion 29, along this conduit 27, and into the annealing shaft 12 via the outlet end portion 30 of that conduit. At the front side of the ribbon, some of the hot ascending gas enters the inlet end portion 31 of the conduit 28, flows along this conduit and enters the annealing shaft 12 via the outlet end portion 32 of that conduit. The velocity of flow of hot gases through the ribbon slot 24, in contact with the faces of the ribbon, is therefore substantially reduced.

The flow of hot gases through the by-pass conduits 27, 28 can take place under natural shaft forces. The by-pass conduits 27, 28 are preferably arranged so that the positions of their inlet and outlet orifices can be adjusted to different spacing from the ribbon. By locating the outlet orifices 30, 32 nearer to the ribbon and to the zone of the high velocity gas currents, an aspiration of gases into the conduits through the inlets 29, 31 is brought about. By adjusting the locations, it is possible to control the amount of the by-pass currents and thus to reduce the high velocity of the gases through the ribbon slot. However, in other cases, it is preferred in this kind of embodiment to provide means for promoting the flow of gases along the by-pass conduits. Such means may for example take the form of small propellers mounted within the conduits. As an alternative, combustion gas may be fed to discharge orifices located within the conduits and burns within the conduits so as to generate convection currents therein.

Figure 4:
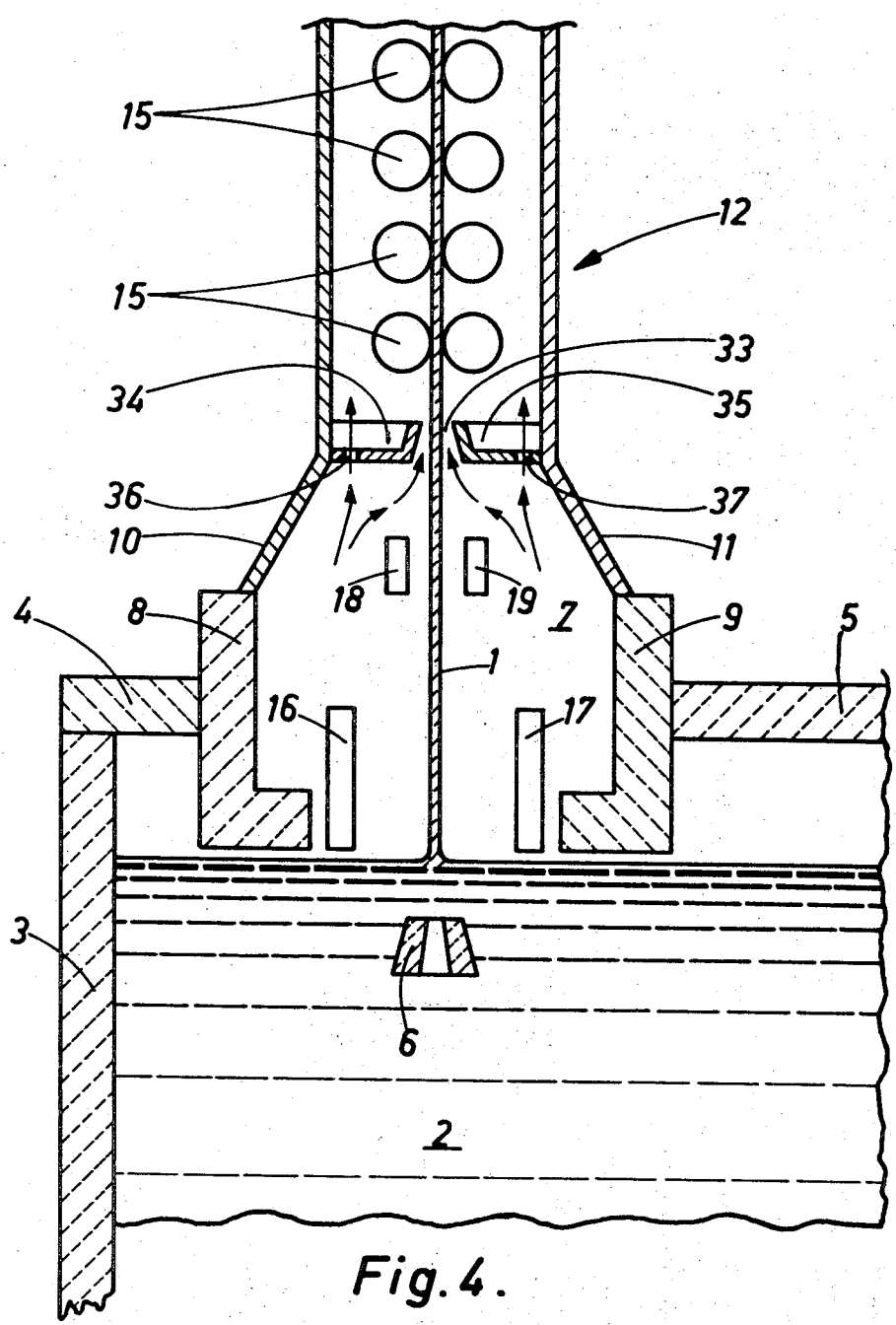

In the embodiment of the invention represented in FIG. 4, the ribbon slot 33 is defined by catch pans 34, 35 but unlike conventional catch pans, these catch pans are formed with apertures 36, 37 which provide alternative paths for the flow of gas from the drawing chamber into the annealing shaft and vice versa. There is a series of apertures 36, disposed in spaced relation along the catch pan 34 and a series of apertures 37 disposed in spaced relation along the catch pan 35. The ascending currents of hot gas which do not actually pass through the ribbon slot 33, will tend to pass through the apertures 36 and 37 which are opposite the projected central part of the ribbon width, whereas the descending colder currents of gas which descend mainly along the side walls of the annealing shaft will flow in part through the end portions of the ribbon slot 33, i.e., the portions of this slot which are traversed by the outer portions of the ribbon width, and in part through the apertures 36 and 37 which are opposite such outer portions of the ribbon width so that such descending colder currents tend to remain localized in the vicinity of the side walls of the apparatus, and thus tend not to contact the faces of the glass ribbon.

Figure 5:
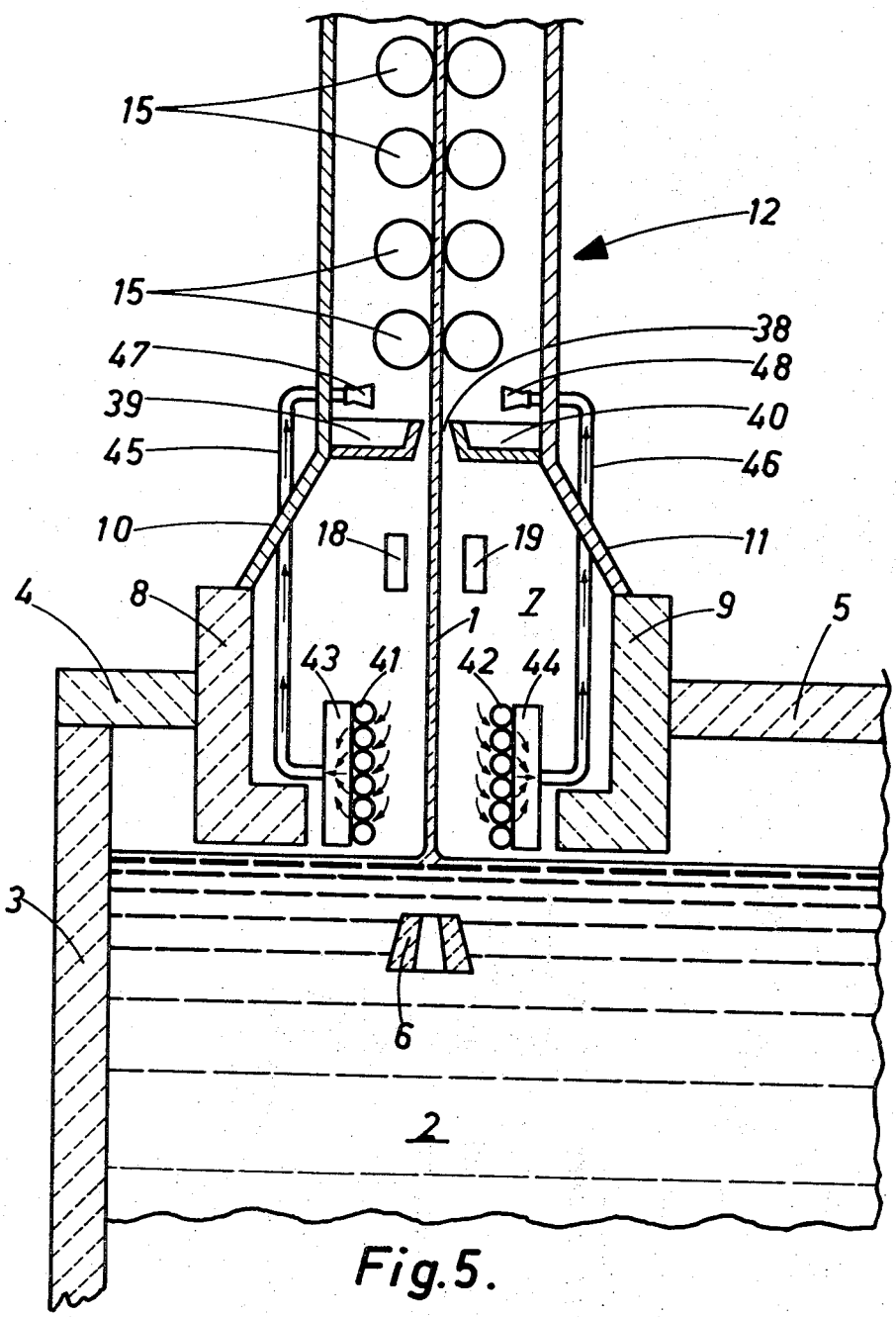

Reference is now made to FIG. 5. In this embodiment of the invention the ribbon slot 38 is defined by catch pans 39 and 40.

In the lower part of the drawing chamber there are principal coolers 41, 42 comprising series of conduits through which cooling fluid is passed, and at the sides of these coolers which are remote from the ribbon path there are suction boxes 43, 44 housing propellers (not shown) which cause cold gas currents which originate on the walls and in the vicinity of the main coolers to be drawn from the environment of the ribbon into the boxes between the conduits constituting the main coolers 41 and 42, as indicated by the arrows in the figure, the conduits being slightly spaced apart to permit this flow of gases between them. The gased drawn into the suction boxes 43 and 44 are propelled along conduits 45 and 46 and discharge into the annealing shaft 12 at a level between the catch pans 39 and 40 and the first pair of drawing roller 15. In actual fact, the conduits 45 and 46 constitute the injection tubes of two ejectors 47, 48. Each of these ejectors is of known type and includes a sleeve or diffuser which surrounds the discharge end portion of the appertaining injection tube. When the machine is in use gas flows from the drawing chamber into the annealing shaft, not ony via the ribbon slot 38, but also via the conduits 45 and 46 which thus constitute "by-passes." Due to the fact that gases are drawn into the conduits 45, 46 from the interior of the drawing chamber and discharge into the annealing shaft across the top of the ribbon slot 38, the volume rate of flow of gases from the drawing chamber into the annealing shaft via the ribbon slot 38 is substantially reduced and there is a concomitant reduction in the volume rate of flow of relatively cold gases from the annealing shaft into the drawing chamber. As a result, the pattern of gas currents established in the upper part of the drawing chamber is modified in a way which has been found substantially to reduce the impairment of the drawn sheet glass by surface defects.

While the invention has been illustrated as embodied in processes and machines according to the Pittsburgh process, the invention can also be embodied in other processes and machines, e.g. in processes and machines in which the glass ribbon, after being drawn upwardly from the supply of molten glass, is bent around a bending roll in the drawing chamber and then passes along a substantially horizontal annealing shaft. In such processes and machines the glass ribbon also travels through a slot between the drawing chamber and the annealing shaft.

It will be understood that the above description of the present invention is susceptible to various modifications, changes and adaptations, and the same are intended to be comprehended within the meaning and range of equivalents of the appended claims.

We claim:

1. Apparatus for use in manufacturing sheet glass, comprising, in combination:

a drawing chamber;

a contiguous annealing shaft which communicates with such drawing chamber;

means defining a slot through which such communication takes place;

means for drawing a continuous ribbon of glass from a supply of molten glass at a drawing zone so that the ribbon passes through such drawing chamber and into the annealing shaft through said slot and convection currents of gases also flow through such slot from the drawing chamber into the annealing shaft and vice versa; and means defining at least one gas flow path said means being of sufficient cross sectional area to reduce the volume rate of flow of gas between the drawing chamber and annealing shaft via said slot in addition to the gas flow path provided by said slot for directing gases to flow along such path between the interior of the drawing chamber and the interior of the annealing shaft, said means being arranged between said chamber and said shaft to direct gases along said path by natural convection currents only.

2. Apparatus as defined in claim 1 wherein in at least one such additional path gases can pass upwardly into the annealing shaft from a region of the drawing chamber within the central third portion of the projected width of the ribbon path.

3. Apparatus as defined in claim 2 wherein in at least one such additional path gases can pass upwardly into the annealing shaft from a region in the top portion of the drawing chamber and within the central third portion of the projected width of the ribbon path.

4. Apparatus as defined in claim 1 wherein at least one such additional path is through the top of the drawing chamber.

5. Apparatus as defined in claim 1 wherein in at least one such additional flow path gases descending opposite an outer third portion of the projected width of the ribbon can flow from the annealing shaft into the drawing chamber.

6. Apparatus as defined in claim 1 wherein in at least one such additional path gases can flow into the annealing shaft from a region in the drawing chamber located with the central third portion of the projected width of the ribbon path and there is at least one such additional path via which gases can simultaneously flow into the drawing chamber from regions in the annealing shaft which are opposite the outer third portions of the ribbon path.

7. Apparatus as defined in claim 1 wherein there is at least one such additional flow path on each side of the path of the ribbon.

8. Apparatus as defined in claim 1 wherein there is at least one such additional flow path via which gases can descend from the interior of the annealing shaft into the drawing chamber, which path is arranged so that descending gases are dispersed at or near the top of the drawing chamber.

9. Apparatus as defined in claim 1 wherein said gas flow path defining means is located in said slot defining means.

10. Apparatus as defined in claim 9 wherein there is a plurality of such additional flow paths which are constituted by the openings of a screen.

11. Apparatus as defined in claim 1 wherein there is at least one such additional flow path via which gases can descend from the interior of the annealing shaft into the drawing chamber, which path is arranged so that descending gases are dispersed away from the path of the ribbon.

12. Apparatus as defined in claim 9 wherein there is a plurality of such additional flow paths which are defined by vanes.

13. Apparatus as defined in claim 1 wherein there is at least one such additional path along which gases can flow into the annealing shaft from a region in the lower part of the drawing chamber.

14. Apparatus as defined in claim 13 comprising at least one cooler located within the lower part of the drawing chamber and wherein at least one such additional path leads into the annealing shaft from a region of the drawing chamber in the vicinity of said cooler.

15. Apparatus as defined in claim 1 wherein the annealing shaft is a vertical shaft surmounting the drawing chamber.

16. Apparatus as defined in claim 1 comprising a molten glass feed channel for holding a bath of molten glass of such depth that molten glass flows into the ribbon from the full depth of such bath.

17. Apparatus as defined in claim 1 comprising a molten glass feed channel for holding a bath of molten glass of such depth that the molten glass which flows into the ribbon is derived from the upper level of such bath.

18. Apparatus as defined in claim 1 comprising a molten glass feed channel along which molten glass feeds to said drawing zone while floating on a mass of material of higher specific gravity.

* * * * *

UNITED STATES PATENT OFFICE
CERTIFICATE OF CORRECTION

Patent No. 3,801,296          Dated April 2nd, 1974

Inventor(s) Michael Lambert, Hubert Neuzy, Claude Brichard

It is certified that error appears in the above-identified patent and that said Letters Patent are hereby corrected as shown below:

In the heading of the patent, line 2, change "Michael" to --Michel--. Column 1, line 39, change "locations" to --location--; line 55, change "ribbons" to --ribbon--. Column 3, line 12, change "he" to --the--; line 15, change "shaft" to --draft--. Column 4, lines 11 and 12, change "locations" to --location--; line 58, correct spelling of "caused". Column 6, line 44, change "such" to --which--. Column 11, line 17, change "shaft" to --draft--. Column 12, line 6, change "gased" to --gases--. Column 13, line 27, change "with" to --within--.

Signed and sealed this 1st day of October 1974.

(SEAL)
Attest:

McCOY M. GIBSON JR.
Attesting Officer

C. MARSHALL DANN
Commissioner of Patents